United States Patent
Yun et al.

(10) Patent No.: US 12,266,822 B2
(45) Date of Patent: Apr. 1, 2025

(54) SEPARATOR LAMINATE FOR LITHIUM SECONDARY BATTERY, ELECTRODE ASSEMBLY INCLUDING THE SAME, AND LITHIUM SECONDARY BATTERY INCLUDING THE SAME

(71) Applicant: LG ENERGY SOLUTION, LTD., Seoul (KR)

(72) Inventors: Hyunwoong Yun, Daejeon (KR); Hoejin Hah, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 705 days.

(21) Appl. No.: 17/441,444

(22) PCT Filed: May 22, 2020

(86) PCT No.: PCT/KR2020/006716
§ 371 (c)(1),
(2) Date: Sep. 21, 2021

(87) PCT Pub. No.: WO2020/235969
PCT Pub. Date: Nov. 26, 2020

(65) Prior Publication Data
US 2022/0166109 A1    May 26, 2022

(30) Foreign Application Priority Data

May 22, 2019  (KR) .................. 10-2019-0060051
May 13, 2020  (KR) .................. 10-2020-0056953

(51) Int. Cl.
H01M 50/449    (2021.01)
H01M 4/134     (2010.01)
(Continued)

(52) U.S. Cl.
CPC ......... H01M 50/449 (2021.01); H01M 4/134 (2013.01); H01M 4/382 (2013.01);
(Continued)

(58) Field of Classification Search
CPC .................. H01M 50/466; H01M 50/469
See application file for complete search history.

(56) References Cited

U.S. PATENT DOCUMENTS

2010/0173205 A1   7/2010  Zeng et al.
2010/0216027 A1*  8/2010  Fujii .................. H01G 11/52
                                           29/25.03
(Continued)

FOREIGN PATENT DOCUMENTS

CN   201340888 Y   11/2009
CN   208226003 U   12/2018
(Continued)

OTHER PUBLICATIONS

Extended European Search Report issued in corresponding European Patent Application No. 20808773.4 dated Mar. 16, 2022.
(Continued)

*Primary Examiner* — Nathanael T Zemui
(74) *Attorney, Agent, or Firm* — MORGAN, LEWIS & BOCKIUS LLP

(57) ABSTRACT

The present disclosure relates to a separator for lithium secondary battery, a method for manufacturing same, and a lithium secondary battery including the same. The separator laminate according to one embodiment of the present disclosure includes: a plurality of separators; and adhesive layers located between mutually adjacent separators among the plurality of separators, wherein the adhesive layers are formed along the edges of the mutually adjacent separators so as to have a separation space between the mutually adjacent separators.

16 Claims, 9 Drawing Sheets

(51) Int. Cl.
*H01M 4/38* (2006.01)
*H01M 4/66* (2006.01)
*H01M 10/0525* (2010.01)
*H01M 10/0583* (2010.01)
*H01M 50/46* (2021.01)
*H01M 50/466* (2021.01)
*H01M 50/489* (2021.01)
*H01M 50/491* (2021.01)
*H01M 4/02* (2006.01)
*H01M 50/443* (2021.01)

(52) U.S. Cl.
CPC ....... *H01M 4/661* (2013.01); *H01M 10/0525* (2013.01); *H01M 10/0583* (2013.01); *H01M 50/461* (2021.01); *H01M 50/466* (2021.01); *H01M 50/489* (2021.01); *H01M 50/491* (2021.01); *H01M 2004/027* (2013.01); *H01M 50/443* (2021.01)

(56) References Cited

U.S. PATENT DOCUMENTS

| | | | |
|---|---|---|---|
| 2012/0321932 | A1 | 12/2012 | Ise et al. |
| 2013/0157096 | A1* | 6/2013 | Nakagiri ........... H01M 10/0587 |
| | | | 429/94 |
| 2014/0004405 | A1 | 1/2014 | Kim et al. |
| 2015/0188111 | A1* | 7/2015 | Whear ................ H01M 50/463 |
| | | | 429/143 |
| 2017/0110703 | A1 | 4/2017 | Kojima et al. |
| 2017/0331091 | A1 | 11/2017 | Modeki |
| 2019/0044118 | A1 | 2/2019 | Sakurai et al. |
| 2019/0319253 | A1 | 10/2019 | An et al. |
| 2020/0052278 | A1 | 2/2020 | Kishi et al. |
| 2020/0075939 | A1 | 3/2020 | Son et al. |
| 2020/0203690 | A1 | 6/2020 | Kwon et al. |
| 2021/0313653 | A1* | 10/2021 | Miller ................... H01M 10/06 |

FOREIGN PATENT DOCUMENTS

| | | |
|---|---|---|
| JP | 2008-016193 A | 1/2008 |
| JP | 2009-009797 A | 1/2009 |
| JP | 2010-073505 A | 4/2010 |
| JP | 2012-199037 A | 10/2012 |
| JP | 2013-105680 A | 5/2013 |
| JP | 2015-046325 A | 3/2015 |
| JP | 2016-081668 A | 5/2016 |
| JP | 2016-103376 A | 6/2016 |
| JP | 2016-103377 A | 6/2016 |
| JP | 2016-207649 A | 12/2016 |
| JP | 2017-130301 A | 7/2017 |
| JP | 2017-152284 A | 8/2017 |
| KR | 10-0389123 B1 | 9/2003 |
| KR | 10-0670429 B1 | 1/2007 |
| KR | 10-2009-0028241 A | 3/2009 |
| KR | 10-2011-0007547 A | 1/2011 |
| KR | 10-2014-0065053 A | 5/2014 |
| KR | 10-2016-0146125 A | 12/2016 |
| KR | 10-2017-0098578 A | 8/2017 |
| KR | 10-2018-0119254 A | 11/2018 |
| KR | 10-2019-0015105 A | 2/2019 |
| KR | 10-2019-0044529 A | 4/2019 |
| WO | 2018-179653 A1 | 10/2018 |

OTHER PUBLICATIONS

International Search Report (with partial translation) and Written Opinion issued in corresponding International Patent Application No. PCT/KR2020/006716, dated Sep. 22, 2020.
Office Action dated Feb. 3, 2025 issued in corresponding Korean Patent Application No. 10-2020-0056953.

* cited by examiner

[FIG. 1]
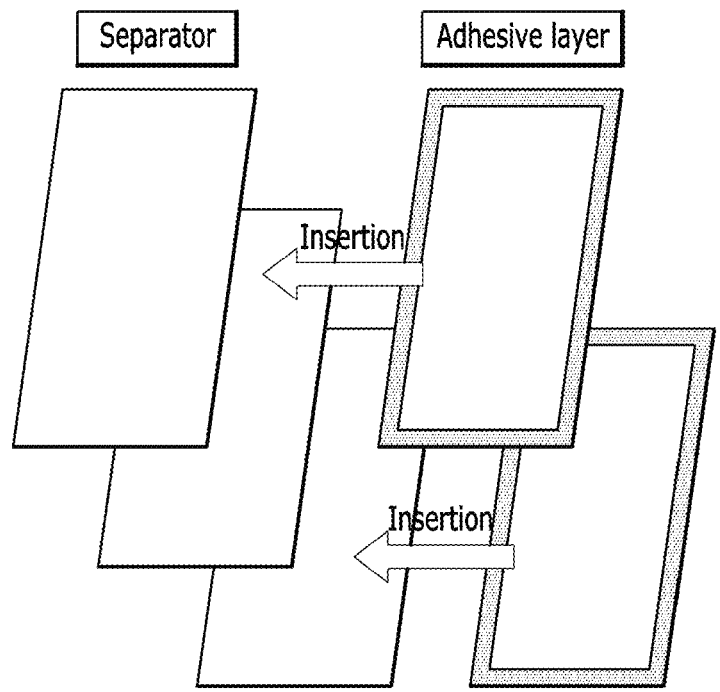

[FIG. 2]
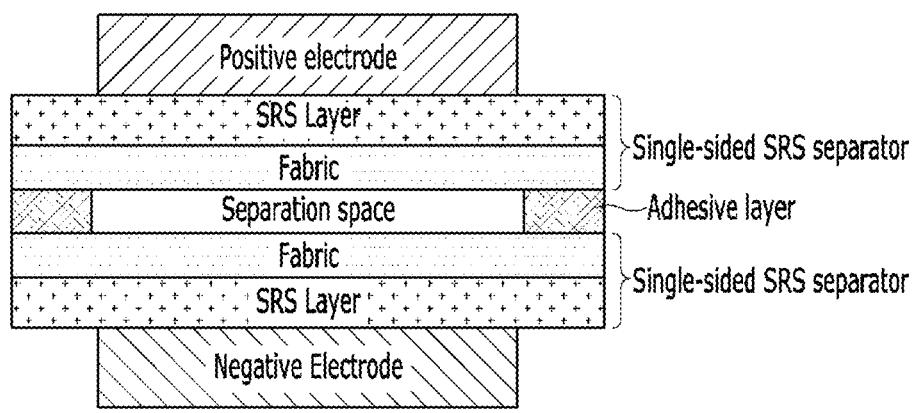
[FIG. 3]
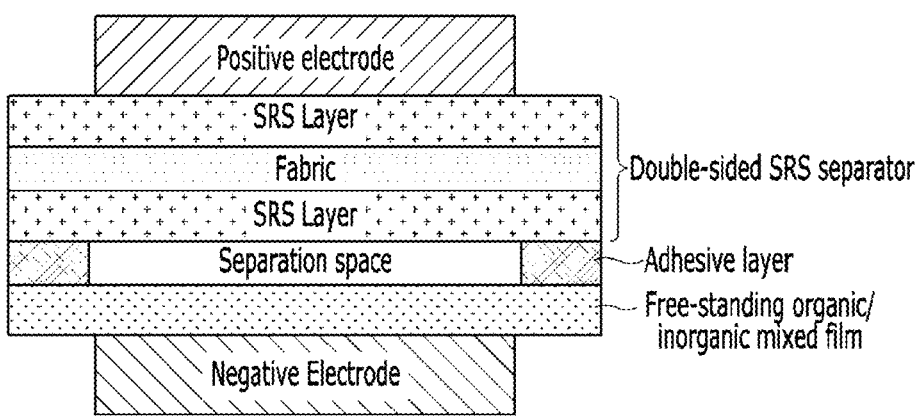

[FIG. 4]
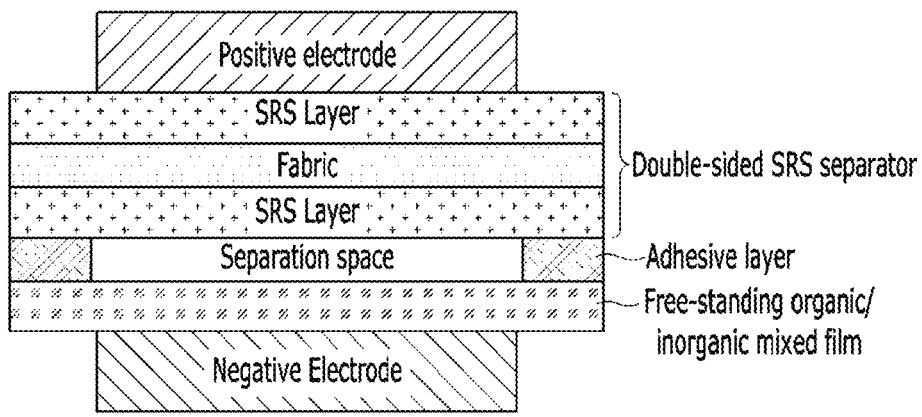
[FIG. 5]
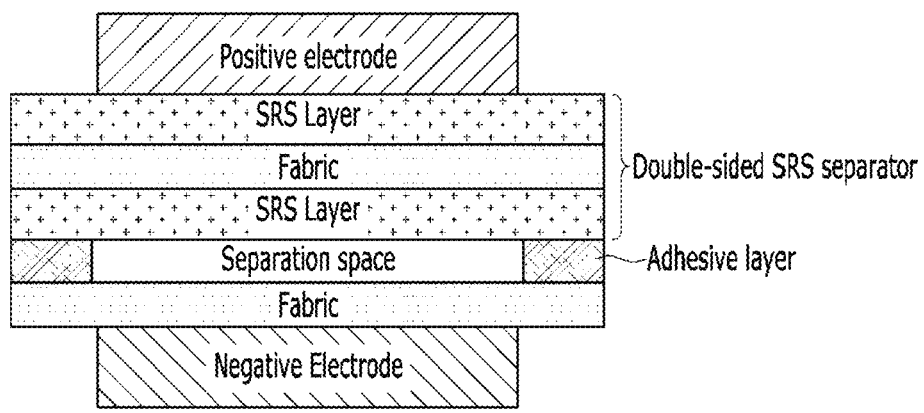

[FIG. 6]
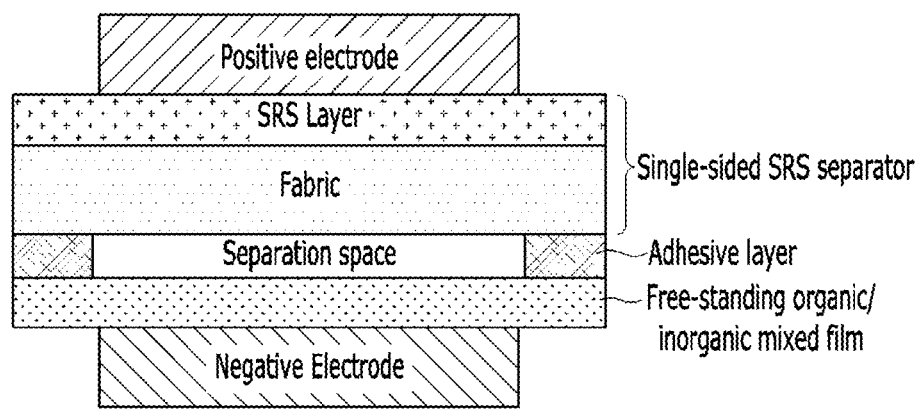
[FIG. 7]
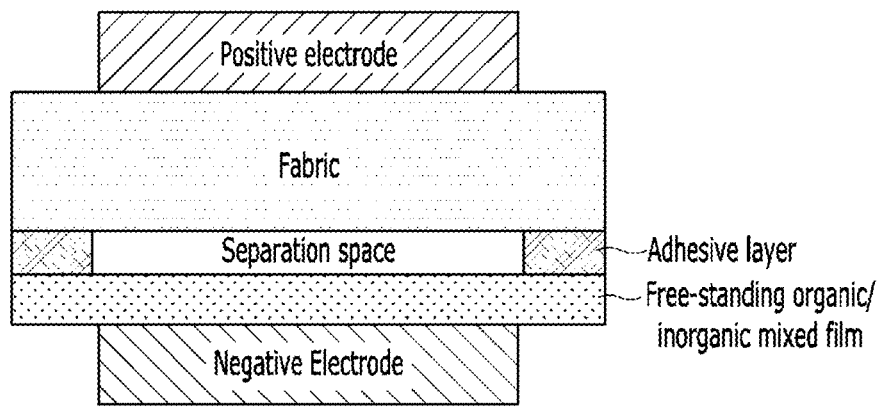

[FIG. 8]
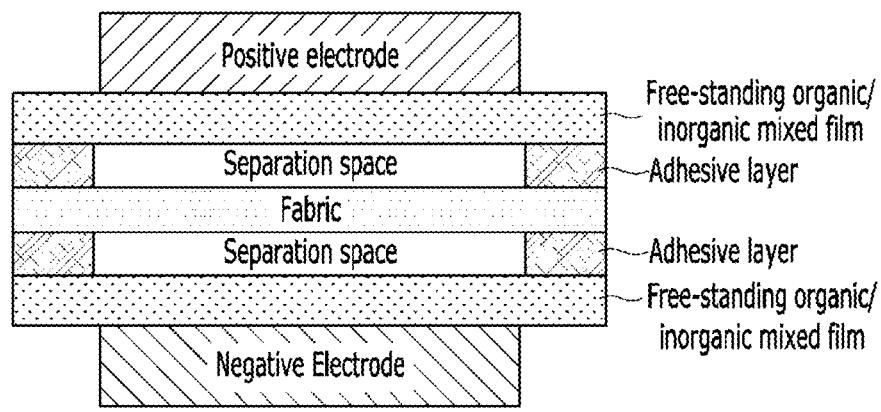
[FIG. 9]
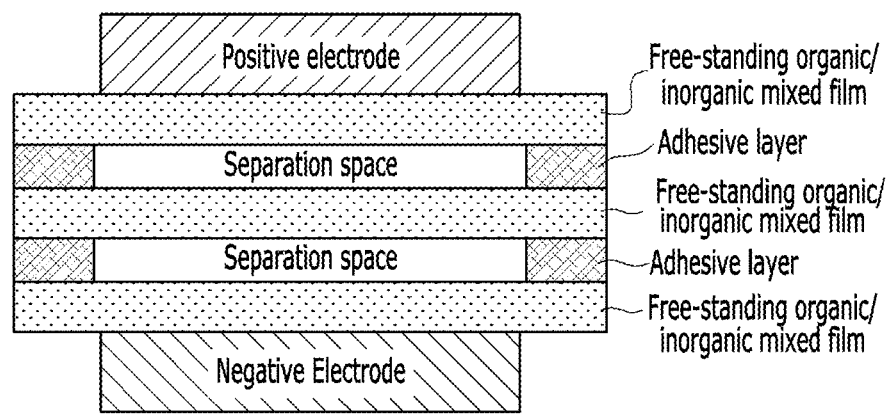

[FIG. 10]
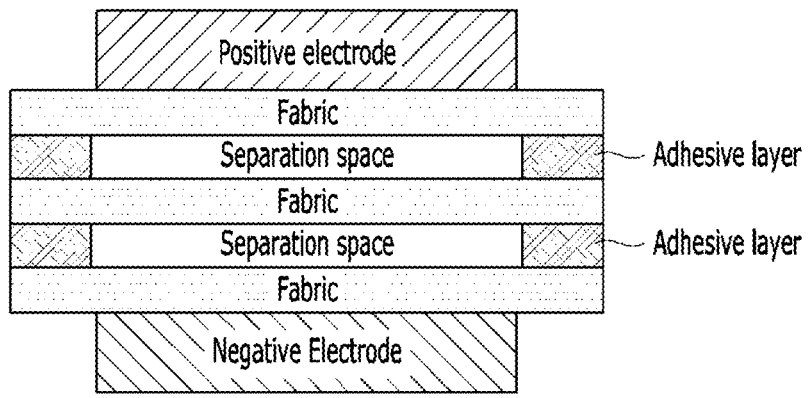
[FIG. 11]
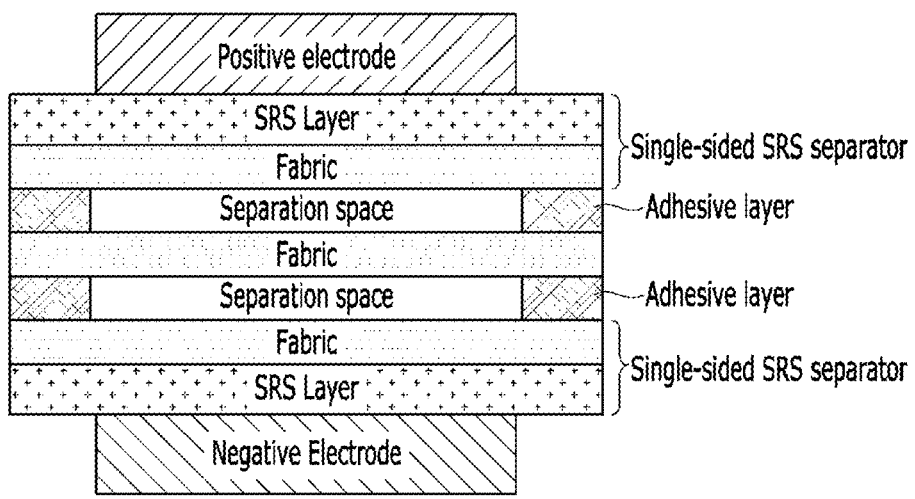

[FIG. 12]
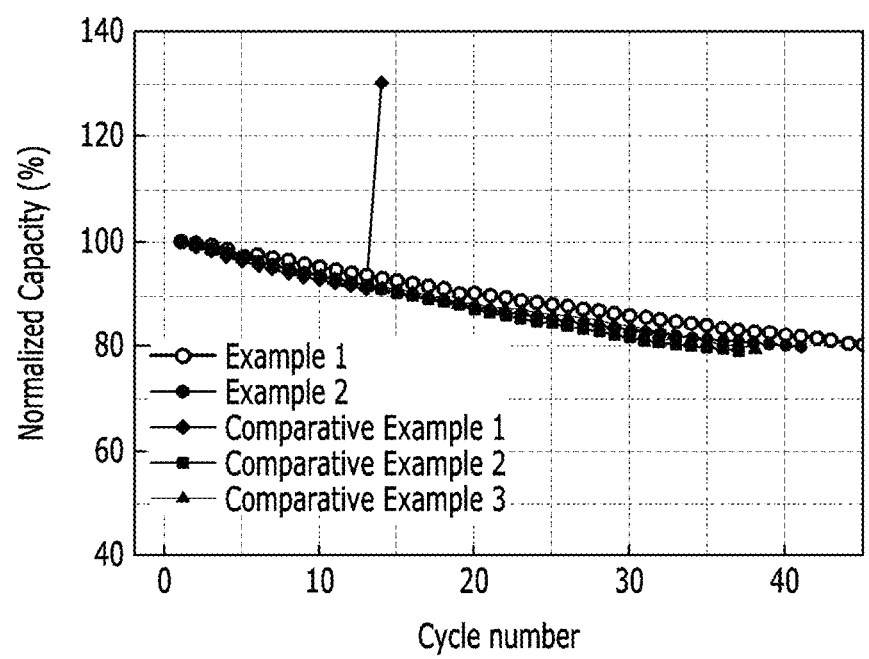
[FIG. 13a]
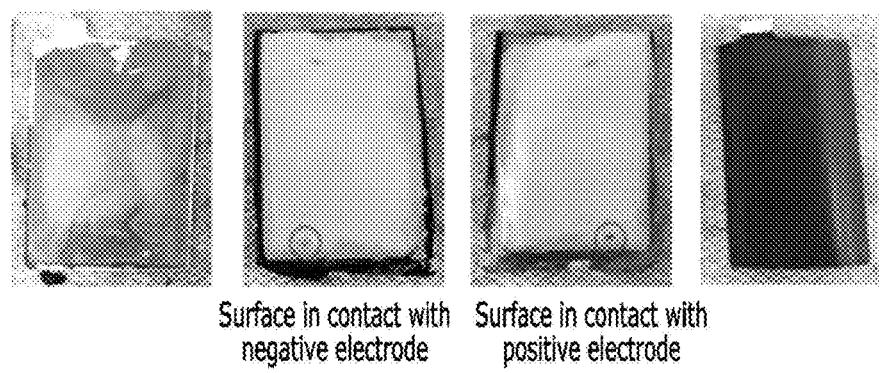
Surface in contact with negative electrode   Surface in contact with positive electrode

[FIG. 13b]
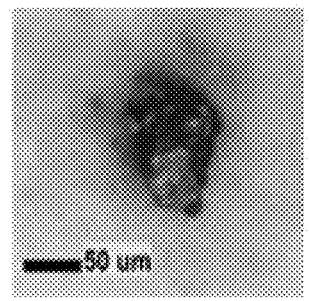
[FIG. 14a]
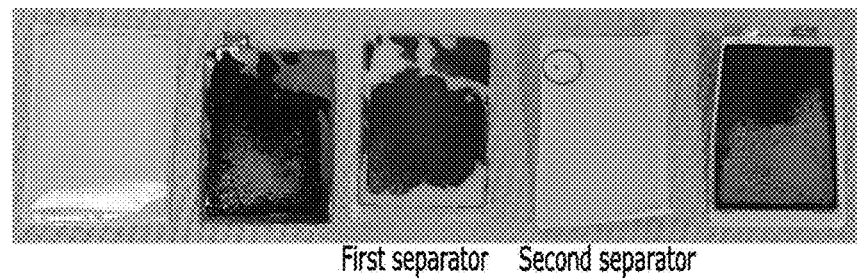
First separator    Second separator
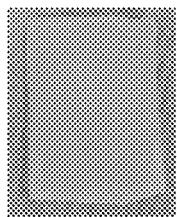
Surface in contact with second
separator positive electrode

[FIG. 14b]
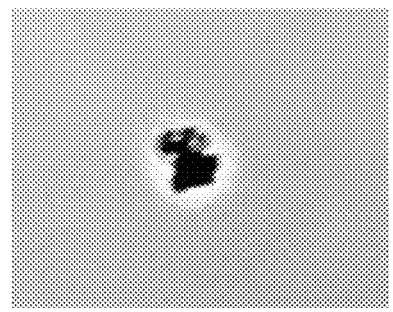
[FIG. 15]
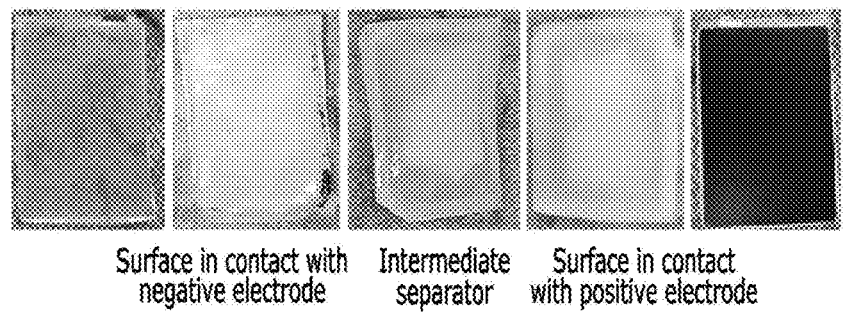
Surface in contact with negative electrode    Intermediate separator    Surface in contact with positive electrode

SEPARATOR LAMINATE FOR LITHIUM SECONDARY BATTERY, ELECTRODE ASSEMBLY INCLUDING THE SAME, AND LITHIUM SECONDARY BATTERY INCLUDING THE SAME

CROSS-CITATION WITH RELATED APPLICATION(S)

This application claims the benefit of Korean Patent Application No. 10-2019-0060051 filed on May 22, 2019 and Korean Patent Application No. 10-2020-0056953 filed on May 13, 2020 with the Korean Intellectual Property Office, the disclosures of which are incorporated herein by reference in their entirety.

The present disclosure relates to a separator laminate for lithium secondary battery, an electrode assembly including the same, and a lithium secondary battery including the same.

TECHNICAL FIELD

Background Art

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibits high charge/discharge characteristics and life characteristics and is environmentally friendly, and has been commercialized and widely used.

The electrode assembly built into a battery case is a chargeable and dischargeable power generation element composed of a laminated structure of positive electrode/separator/negative electrode, and is classified as a jelly-roll type electrode assembly having a configuration of winding a long-sheet type positive electrode and a long-sheet type negative electrode in a state in which a separator is interposed therebetween, a stack type electrode assembly having a configuration in which pluralities of positive electrodes and negative electrodes each having a predetermined size are consecutively stacked in a state in which separators are disposed between the two electrodes, or as a combination thereof, a stack/folding type electrode assembly having a construction of winding bi-cells or full cells, including a positive electrode, a negative electrode and a separator, into a long-sheet type separation film, and a laminate/stack type electrode assembly having a configuration of stacking after laminating the bi-cell or full cell.

Meanwhile, in general, a lithium secondary battery has a structure in which a non-aqueous electrolyte is impregnated into an electrode assembly comprising a positive electrode, a negative electrode, and a porous separator. The positive electrode is generally manufactured by coating a positive electrode mixture including a positive electrode active material onto aluminum foil, and the negative electrode is manufactured by coating a negative electrode mixture including a negative electrode active material onto a copper foil.

Usually, the positive electrode active material uses a lithium transition metal oxide, and the negative active material uses a carbon-based material. However, recently, as a negative electrode active material, a lithium metal battery using lithium metal itself has been commercialized.

Usually, a lithium ion battery uses a carbon-based material (theoretical capacity: 372 mAh/g) as a negative active material, whereas a lithium metal battery uses lithium metal (theoretical capacity: 3600 mAh/g) as a negative electrode active material, and thus, have an advantage that the amount of energy is theoretically increased by 10 times or more.

Such a lithium metal battery may be the copper current collector itself or lithium metal negative electrode adhered to its surface, and performs a discharge/charge by using electrochemical reactions, in which the lithium metal desorbed from the surface of the negative electrode is ionized and moved to the positive electrode via the electrolyte (discharge), and lithium ions that have lost electrons from the positive electrode move to the negative electrode via the electrolyte and are reduced and electrodeposited from the surface of the negative electrode (charging).

Meanwhile, the lithium secondary battery causes a short circuit due to various factors, and as an example, the point at which the transition metal eluted from the positive electrode active material is electrodeposited on the negative electrode surface is the starting point of the metal column, and lithium metal is further electrodeposited at the starting point, and as a result, the metal column may grow through the pores of the separator and makes contact with the positive electrode, thereby causing a micro-short-circuit.

This micro-short circuit allows lithium metal batteries to expose to a lot of danger as lithium metal has a higher reactivity compared to carbon-based materials.

Such a micro-short circuit may also shorten the life of the lithium secondary battery.

DETAILED DESCRIPTION OF THE INVENTION

Technical Problem

In one embodiment of the present disclosure, by forming an adhesive layer along the edges of adjacent separators so as to have a separation space between the separators while laminating N (however, N≥2) separators, the separation space formed between the separators can induce the vertically growing metal columns to grow horizontally even if the separator adjacent to the negative electrode is pierced by a metal column, thereby providing a separator laminate for a lithium secondary battery capable of inhibiting a short circuit by the remaining separator.

In addition, by arranging an adhesive layer between adjacent separators inside the laminate, the separator laminate of the one embodiment is suitable for use in an electrode assembly having a lamination structure.

Further, when at least one separator contained in the separator laminate is composed of an SRS separator or a free-standing organic/inorganic mixed film, it is excellent in mechanical strength and can strengthen a primary defense against attacks from metal column.

Technical Solution

Throughout the specification, when a part is referred to as "including" a certain component, it means that it can further include other components, without excluding the other components, unless otherwise stated.

The term "about or approximately" or "substantially" used herein is intended to have meanings close to numerical values or ranges specified with an allowable error and intended to prevent accurate or absolute numerical values disclosed for understanding of the present disclosure from being illegally or unfairly used by any unconscionable third party. Further, throughout the specification, the term "step of" does not mean "step for".

Throughout the specification, the term "combination(s) thereof" included in Markush type description means mixture or combination of one or more selected from a group consisting of components described in Markush type and thereby means including one or more selected from a group consisting of the components.

Based on the above definitions, embodiments of the present disclosure will be described in detail. However, these are presented for illustrative purposes only, and the present disclosure is not limited thereto, and the present disclosure is only defined by the scope of the claims described later.

Separator Laminate for Lithium Secondary Battery

In one embodiment of the present disclosure, there is provided a separator laminate for a lithium secondary battery comprising: N (however, N≥2) separators; and N−1 adhesive layers located between adjacent separators, wherein the N−1 adhesive layers are respectively formed along the edges of adjacent separators so as to have a separation space between the separators.

The separator laminate is those obtained by laminating N (however, N≥2) separators. Therefore, in contrast to the case of using one separator, the overall thickness may be increased, thereby improving mechanical strength.

However, in order to prevent the thickness of the separator laminate from becoming too thick, the upper limit of N may be 5, specifically 3. Within this range, the total thickness of the separator laminate may satisfy 1 μm to 60 μm, specifically 9 μm to 30 μm.

On the other hand, in the separator laminate, even if one separator adjacent to the negative electrode in the separator laminate is pierced by a metal column, the growth of the metal column may be suppressed by another separator adjacent thereto, unlike the case of using one separator of the same thickness as the above.

The growth direction of the metal column may be changed from the vertical direction to the horizontal direction by a separation space between the separators formed by the adhesive layer described below.

Each of the N separators may use separators having various structures and compositions, and can include, but not limited thereto, all conventionally known structures.

For example, each of the N separators may be one selected from the group consisting of a single-sided SRS separator, a double-sided SRS separator, a polyolefin fabric, a free-standing organic/inorganic mixed film, and a polymer-based separator.

The SRS separator has a structure in which an organic/inorganic composite porous coating layer is coated onto a polyolefin-based substrate.

For the specific contents of such an SRS separator, the contents disclosed in Korean Patent Application No. 10-2009-0018123 filed by the present applicant are incorporated by reference.

Specifically, the organic/inorganic composite porous coating layer includes inorganic particles and a binder having a function of bonding them to each other and bonding the substrate and the coating layer.

The inorganic particles perform both the role of forming fine pores by enabling the formation of empty regions between inorganic particles and the role of a kind of spacer capable of maintaining a physical shape. In addition, since the inorganic particles generally have properties that their physical properties do not change even at a high temperature of 200° C. or more, the formed organic/inorganic composite porous coating layer has excellent heat resistance.

The inorganic particles are not particularly limited as long as they are only electrochemically stable. That is, the inorganic particles that can be used in the present disclosure are not particularly limited as long as the oxidation and/or reduction reaction does not occur in the operating voltage range (e.g., 0 to 5V based on Li/Li$^+$) of the applied battery. In particular, when using inorganic particles having ion transferring capability, the ionic conductivity in the electrochemical element can be increased to improve the performance, and thus, it is desirable that the ionic conductivity is as high as possible. Further, when the inorganic particles have a high density, not only it is difficult to disperse during manufacturing, but there is also a problem of weight increase during battery manufacturing. Thus, it is desirable that the density is as small as possible. Further, in the case of an inorganic material having a high dielectric constant, it is possible to increase the ionic conductivity of the electrolyte by contributing to an increase in the degree of dissociation of an electrolyte salt, such as a lithium salt, in a liquid electrolyte. Finally, in the case of inorganic particles having thermal conductivity, since they have an excellent heat absorbing capability, heat is locally concentrated to form a heating point, thereby inhibiting the phenomenon leading to thermal runaway, which is more preferable.

For the above reasons, the inorganic particles are preferably at least one selected from the group consisting of (a) high dielectric constant inorganic particles having a dielectric constant of 1 or more, 5 or more, and preferably 10 or more, (b) inorganic particles having piezoelectricity, and (c) inorganic particles having a lithium ion transferring capability.

Non-limiting examples of the inorganic particles having a dielectric constant of 1 or more include any one selected from the group consisting of $Al_2O_3$, $SrTiO_3$, $SnO_2$, $CeO_2$, MgO, NiO, CaO, ZnO, $ZrO_2$, $Y_2O_3$, $TiO_2$, $SiO_2$, SiC and a mixture thereof. When the inorganic particles having a high dielectric constant, inorganic particles having piezoelectricity and inorganic particles having lithium ion transferring capability are mixed and used, a synergistic effect resulting therefrom can be doubled.

The inorganic particles having piezoelectricity refer to a material which is an insulator under normal pressure, but has physical properties of allowing current flow due to the change of its internal structure when a certain range of pressure is applied thereto. Not only the inorganic particles show a high dielectric constant of 100 or more, but also they are charged positively on one surface while being charged negatively on the other surface, when they are drawn or compressed by applying a certain range of pressure. Hence, they may be materials having the function of causing an electric potential difference between the both surfaces.

When the inorganic particles having the above characteristics are used as the inorganic coating layer component, a positive electrode and a negative electrode are prevented from being in direct contact with each other by the coated inorganic particles when an internal short circuit occurs between both electrodes due to external impacts such as local crush, a nail, or the like. Additionally, such piezoelectricity of the inorganic particles can permit generation of a potential difference in the particles even by external shock, thereby allowing electron movements, i.e. minute flow of electric current between the two electrodes, so that it is possible to accomplish a slow decrease in the voltage of a battery and to improve the safety of a battery.

Examples of the inorganic particles having piezoelectricity include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT) hafnia ($HfO_2$) or mixtures thereof, but are not limited thereto.

The inorganic particles having lithium ion transferring capability are referred to as inorganic particles containing lithium elements and having a capability of transferring lithium ions without storing lithium. The inorganic particles having lithium ion transferring capability may transfer and move lithium ions due to a kind of defect existing in the particle structure, so it is possible to prevent the reduction in lithium mobility due to the formation of the separator and thus prevent a decrease in battery capacity.

Examples of the inorganic particles having the lithium ion transferring capability include lithium phosphate($Li_3PO_4$), lithium titanium phosphate($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$ and a mixture thereof, but are not limited thereto.

When the inorganic particles having a high dielectric constant, inorganic particles having piezoelectricity and inorganic particles having lithium ion transferring capability are mixed and used, a synergistic effect resulting therefrom can be doubled.

Although the size of inorganic particles is limited, inorganic particles preferably have a size of 0.001 to 10 µm for the purpose of forming a film having a uniform thickness and securing a suitable porosity. If the size of inorganic particles is less than 0.001 µm, inorganic particles have poor dispersibility so that it may be difficult to adjust the physical properties during the production of an organic/inorganic composite porous coating layer. If the size is greater than 10 µm, the separator has an increased thickness, resulting in degradation in mechanical properties. Furthermore, such excessively large pores cannot perform a sufficient insulating role and may increase a possibility of internal short circuit being generated during charge/discharge of the battery.

On the other hand, the binder, which is another component, is not limited as long as it does not cause a side reaction with the electrolyte, but in particular, it is possible to use a binder having a glass transition temperature as low as possible, preferably in the range of −200 to 200° C. This is because the mechanical properties of the final SRS separator can be improved.

Further, it is more preferable to use a polymer having ion conductivity as the binder. This is in order not to lower the lithium ion mobility in the separator.

Accordingly, a binder having a high dielectric constant as possible is preferred. Actually, because a degree of dissociation of salts in an electrolyte solution relies on a dielectric constant of an electrolyte solvent, as the dielectric constant of the polymer increases, the degree of dissociation of salts in the electrolyte may be improved. The dielectric constant of the polymer may be 1 or more, specifically, in a range of 1.0 to 100 (measured at frequency of 1 kHz), in particular, preferably, higher than or equal to 10.

In addition to the above-described functions, the binder polymer may be characterized in that it is gelled when swelled with a liquid electrolyte, and thus shows a high degree of swelling. Actually, when the binder is a polymer having a high degree of swelling with an electrolyte, the electrolyte injected after the assemblage of a battery infiltrates into the polymer, and the polymer containing the infiltrated electrolyte also has electrolyte ion conductivity. Therefore, it is preferable to use a polymer having a solubility parameter between 15 and 45 $MPa^{1/2}$, more preferably between 15 and 25 $MPa^{1/2}$, and between 30 and 45 $MPa^{1/2}$. If the binder polymer has a solubility parameter of less than 15 $MPa^{1/2}$ or greater than 45 $MPa^{1/2}$, it has difficulty in swelling with a conventional liquid electrolyte for a battery.

Examples of the binder include one selected from the group including polyvinylidene fluoride (PVdF), polytetrafluoroethylene (PTFE), styrene butadiene rubber (SBR), polyvinylidene fluoride-co-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyethylene oxide, celluloseacetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide and polybinylalcohol, or a mixture of two or more thereof, but is not limited thereto. Any material may be used alone or in combination as long as it contains the above-described properties.

The volume ratio of the inorganic particles and the binder is also not particularly limited.

However, in order to form a pore of an appropriate size in the coating layer to secure ionic conductivity, the volume ratio of the inorganic particles and the binder can be adjusted within the range of 1:99 to 99:1, for example, it can be controlled from 40:60 to 60:40. Within this range, as the volume of the inorganic particles relative to the binder increases, the porosity of the separator increases, which results in an increase in the thickness of the separator. Additionally, the size of the pores between the inorganic particles increases. At this time, as the size (particle diameter) of the inorganic particles increases, interstitial distance between the inorganic particles increases, thereby increasing the size of the second pores in the coating layer.

In the case of an SRS separator including an organic/inorganic composite porous coating layer in which a binder and inorganic particles are mixed in this way, the SRS separator has a uniform pore structure formed by the interstitial volume between inorganic particles. Through these pores, smooth movement of lithium ions is carried out, and a large amount of electrolyte is filled, thereby exhibiting a high degree of swelling.

At this time, the pore size and porosity may be controlled together by adjusting the inorganic particle size and content.

Further, the SRS separator having an organic/inorganic composite porous coating layer made of the inorganic particles and a binder does not cause high temperature heat shrinkage due to the heat resistance of inorganic particles. Therefore, since the separator is maintained even under excessive conditions due to internal or external factors such as high temperature, overcharging, and external shock, it is effective in preventing short circuit, and may delay thermal runaway due to the heat absorbing effect of inorganic particles.

The organic/inorganic composite porous coating layer may further include commonly known additives in addition to the inorganic particles and the binder.

The single-sided SRS separator refers to a separator having a structure in which an organic/inorganic composite porous coating layer is formed on one side of a polyolefin-based substrate. The double-sided SRS separator refers to a separator having a structure in which an organic/inorganic composite porous coating layer is formed on both sides of a polyolefin-based substrate.

The polyolefin-based substrate may be in the form of a porous membrane used as a substrate for a separator in the art.

The polyolefin-based substrate is not limited as long as it is a polyolefin-based, and for example, it may be a porous polymer film made of polyolefin-based polymers such as ethylene homopolymer, propylene homopolymer, ethylene/butene copolymer, ethylene/hexene copolymer, and ethylene/methacrylate copolymer, or a laminated structure of two or more layers thereof.

Further, the polyolefin-based substrate may have a porosity of 20 to 80% by volume with respect to the total volume of the substrate. If the porosity of the substrate is less than 20% by volume, the internal resistance of the lithium secondary battery including the same may increase rapidly. If the porosity of the substrate exceeds 80% by volume, there is a concern that battery performance may be deteriorated due to a decrease in mechanical strength of the separator and formation of an excessive coating layer.

Further, the substrate may include a first pore having a D50 of 1 nm to 500 nm in the substrate. If the D50 of the first pore is less than 1 nm, the coating layer is not easily formed, or the improvement effect due to the formation of the coating layer is insignificant, and if the D50 of the first pore exceeds 500 nm, there is a risk that the mechanical strength of the separator itself is reduced.

On the other hand, a polyolefin fabric that can be used as the N separators may also be the polyolefin-based substrate.

The free-standing organic/inorganic mixed film is sometimes named an all ceramic separator, and it refers to a separator in which the organic/inorganic composite porous coating layer in the SRS separator described above is produced in the form of a film.

This free-standing organic/inorganic mixed film can be produced by forming the coating layer on a release film and then removing the release film.

When using such a free-standing organic/inorganic mixed film as a separator, the advantages of the SRS separator as described above can be obtained as a thinner structure, and thus, there is an effect that both safety and energy density can be improved.

The polymer-based separator may be produced by mixing various polymer resins and a binder in the same manner as the free-standing organic/inorganic mixed film.

Here, the binder may be an ion conductive polymer, as mentioned in the SRS separator.

Such a polymer-based separator may be, for example, a polymer-based polymer film such as polyethylene and polypropylene, or a porous ion conductive polymer film such as porous polyethylene oxide (PEO), porous polyacrylonitrile (PAN), porous polymethyl methacrylate (PMMA), and porous polyethylene glycol methacrylate (PEGMA).

On the other hand, when the organic/inorganic porous composite coating layer of the SRS separator is formed on the outermost surface of the separator laminate, or a free-standing organic/inorganic mixed film is formed, as described above, the effect of preventing a micro-short circuit by the inorganic particles may be more effectively implemented.

Therefore, at least one of the N separators may be one selected from the group consisting of a single-sided SRS separator, a double-sided SRS separator, and a free-standing organic/inorganic mixed film. More specifically, the separators located at the outermost side may be one selected from the group consisting of the single-sided SRS separator, the double-sided SRS separator, and the free-standing organic/inorganic mixed film.

On the other hand, as the overall thickness of the separator laminate is thicker, it is advantageous to improve safety, while as the overall thickness of the separator laminate is thinner, it is advantageous to improve the energy density of the lithium secondary battery, so that the structure may be freely selected, formed, and combined according to the performance of the desired lithium secondary battery.

On the other hand, in the separator laminate, N−1 adhesive layers are disposed between adjacent separators. The N−1 adhesive layers may be in contact with separators located above and below the layers, respectively.

For example, when two separators are included in the separator laminate, one adhesive layer may be located between the separators. In addition, when three separators are included in the separator laminate, one adhesive layer is located between adjacent separators, so that a total of two adhesive layers may be included.

In this way, the N (however, N≥2) separators may be connected and fixed to each other by the N−1 adhesive layers, and a separator laminate for a lithium secondary battery including the same may be suitable for application to an electrode assembly having a laminated structure.

Hereinafter, the adhesive layer will be described in more detail.

Adhesive Layer

As described above, the separator laminate for a lithium secondary battery according to the one embodiment includes a laminate in which N (however, N≥2) separators are laminated, and N−1 adhesive layers may be located between adjacent separators inside the laminate.

Here, the N−1 adhesive layers are formed along the edges of adjacent separators so as to have a separation space between the separators, respectively. More specifically, each of the N−1 adhesive layers may be in the form of a frame in which the central portion is opened, and by this type of adhesive layer, border portions of the separators adjacent to the adhesive layer may be connected and fixed to each other.

Here, the edge of the separators and the border portion of the separators may coincide with each other.

For example, as shown in FIG. 1, an adhesive layer in the form of a frame formed over the entire border portion of the separators may be formed between adjacent separators inside the separator laminate.

The adhesive layer is formed in the form of a coating on the border portion of one-sided separator, the other-sided separators are laminated, and then dried to connect and fix the separators to each other, which is manufactured in the form of a separate adhesive film, interposed between the separators, and then laminated by applying heat, pressure, or both, so that adjacent separators can be connected and fixed to each other. Thereby, it is possible to obtain a separator laminate in which the N (however, N≥2) separators are integrated by the N−1 adhesive layers, which can be a so-called "integrated" separator.

In this case, even if one separator adjacent to the negative electrode in the separator laminates is pierced by a metal column, the growth of the metal column is suppressed by another separator adjacent thereto, and then, in the separation space created by the formation of an adhesive layer located between the separators, the growth direction of the metal column is formed and confined in the horizontal direction. Thereby, the problem of the above-described micro-short circuit can be effectively prevented.

Therefore, the formation of the adhesive layer according to the present disclosure should be formed so as to form a separation space between adjacent separators, and the formation of such a separation space is very important.

Meanwhile, the shape of the separation space formed by each of the adhesive layers is not particularly limited, and may be a polygonal shape such as a rectangular shape, or a circular shape, and may have the same or different shapes in the N−1 adhesive layers.

Meanwhile, the area occupied by the separation space is not particularly limited, and may be the same or different in the N−1 adhesive layers. Since each of the adhesive layers may be formed on the border portions of the separators, the area of the separation space may be determined according to the width of the border portion.

However, when the separation space becomes too small and the width in which the adhesive layer is formed is widened, there is a high possibility that metal columns generated on the surface of the negative electrode will grow in the site of the adhesive layer. When metal columns grow in the adhesive layer in this way, the growth direction cannot be changed and thus, the short-circuit prevention effect as described above is deteriorated, which is not preferable. When the separation space becomes too large and the width of the adhesive layer is narrowed, the separators cannot be effectively connected and fixed, which is not preferable.

Therefore, the area occupied by the separation space is not limited, but may be 50 to 99 area %, 50 to 90 area %, 50 to 85 area %, or 50 to 80 area %, and the remaining area is occupied by the adhesive layer, so that the adjacent separators can be adhered thereto.

More specifically, since the area occupied by the separation space is generally larger than that of the positive electrode and the negative electrode, it may be the same as the area of the positive electrode or the negative electrode in the electrode assembly to be described later and also manufactured later, specifically, it may be the same as the area of the negative electrode in which the metal column is grown.

On the other hand, the constituent component of the adhesive layer has adhesion to the adjacent separators, and it is not particularly limited as long as it is a material of binders that does not impair battery characteristics.

More specifically, the adhesive layer may include, for example, one selected from the group consisting of polyvinylidene fluoride (PVdF), polytetrafluoroethylene (PTFE), styrene butadiene rubber (SBR), polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and polyvinylalcohol, or a mixture of two or more thereof.

The thickness of the adhesive layer provides sufficient separation space to change the growth direction of the metal column, wherein in order to solve the problem that the total thickness of the separator laminate is made too thick and the energy density of the lithium secondary battery including the same is lowered, it is preferable to set it appropriately, specifically, it may be formed from 0.01 μm to 100 μm, more specifically from 0.1 to 10 μm.

Method for Manufacturing a Separator Laminate for Lithium Secondary Battery

The method of manufacturing the separator laminate for a lithium secondary battery according to the one embodiment is not particularly limited as long as it is a method capable of forming the above-described structure.

When two separators are used as in Example 1 described later, the separator laminate can be manufactured by using either one of the separators as an upper separator, using another separator as a lower separator, coating the adhesive layer along the edge of the upper separator or the lower separator, then laminating the upper separator and the lower separator and drying the adhesive layer. Alternatively, the separator laminate may be manufactured by inserting an adhesive layer in the form of a film between the upper separator and the lower separator and then performing lamination.

Here, the edge is the same as a border portion, and means the area of the portion adjacent to the four corners of the separator. The specific width is the same as described above, and is a portion where the adhesive layer is formed in FIG. 1.

Further, when three separators are used as in Example 2 described later, one separator is used as the upper separator, another separator is used as the lower separator, and the other separator is used as an intermediate separator, to thereby form an adhesive layer as in the case of using the two separators so that the separators can be adhered along edges of adjacent separators.

Electrode Assembly and Lithium Secondary Battery Including Same

In another embodiment of the present disclosure, there is provided an electrode assembly comprising: a negative electrode; a positive electrode; and the separator laminate of the above-mentioned one embodiment located between the negative electrode and the positive electrode.

At this time, the separator laminate is larger than the area of the negative electrode and the positive electrode at four corners. The adhesive layer formed on the separator laminate may be formed at a portion not facing the negative electrode or the positive electrode along the edge of the separator included in the separator laminate.

When the adhesive layer is formed only in the portion not facing the negative electrode and the positive electrode in this way, it does not interfere with lithium ions of the negative electrode and the positive electrode while the separators can be adhered, and and forms a separation space between the negative electrode and the positive electrode Thus, it is easy to change the growth direction of the metal column growing from the negative electrode. More specifically, in order to provide a separation space at the growth position of the metal column grown from the negative electrode, the adhesive layer may be formed at a portion not facing the negative electrode along the edges of the separators included in the separator laminate.

As an example, a unit electrode assembly including a separator laminate made by bonding different types of separators by two or three is shown in FIGS. 2 to 12.

As shown in FIGS. 2 to 12, the types of separators included in the separator laminate can be variously combined, and the adhesive layer formed therebetween is formed between adjacent separators inside.

Further, at this time, the adhesive layer is formed at a portion not facing the positive electrode or the negative electrode along the edges of the separators.

On the other hand, the electrode assembly may be variously implemented in a stack process, a lamination and stack process, a stack and folding process, a jelly-roll process, and a zigzag folding process, as it includes the separator laminate of the above-described one embodiment.

In addition, in another embodiment of the present disclosure, there is provided a lithium secondary battery including the electrode assembly. For example, the lithium secondary battery may include an electrolyte in the electrode assembly.

When charging the lithium secondary battery with a constant current of 0.1 C in a temperature range of 20 to 30° C. until reaching 4.25 V and then discharging the lithium secondary battery with a constant current of 0.5 C until reaching 3.0 V is referred to as one charge/discharge cycle, at the point of the time the capacity retention rate according to the following Equation 1 reaches 80%, n may be 30 or more, specifically 35 or more, and more specifically 40 or more:

$$\text{Capacity retention rate (\%)} = 100 \times \{\text{Discharge capacity after } n \text{ cycles}\} / \{\text{Discharge capacity after 1 cycle}\} \quad \text{[Equation 1]}$$

The detailed description concerning the separator laminate applied to the lithium secondary battery of the one embodiment is the same as described above, and hereinafter, battery components other than the separator will be described in detail.

Negative Electrode

In general, the negative electrode of a lithium secondary battery may have a structure in which a negative electrode mixture including a negative electrode active material is formed on a negative electrode current collector.

The negative electrode current collector is generally fabricated to a thickness of 3 to 500 micrometers. The negative electrode current collector is not particularly limited so long as a corresponding battery has high conductivity without causing chemical changes in the battery. For example, the negative electrode current collector may be made of copper, stainless steel, aluminum, nickel, titanium, baked carbon, or a material formed by surface-treating g a surface of copper or stainless steel with carbon, nickel, titanium, silver, or the like, or may use an aluminum-cadmium alloy or the like. In addition, similar to the positive electrode current collector, the negative electrode current collector may have fine protrusions and depressions formed on a surface thereof to enhance adherence of a negative electrode active material, and may be formed in various forms such as a film, a sheet, a foil, a net, a porous body, a foaming body, and a nonwoven fabric structure.

An example of the negative electrode active material may include carbons such as hardly graphitizable carbon and graphite-based carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, 3 elements in the periodic table, halogen; $0 \leq x \leq 1$; $1 \leq y \leq 3$; $1 \leq z \leq 8$); lithium titanium oxide, lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; a conductive polymer such as polyacetylene; Li—Co—Ni based materials and the like.

Here, as mentioned above, in the according to the present disclosure may be a lithium-free battery in which a secondary battery using lithium metal as an active material is used as a lithium metal battery, further only the current collector is used as a negative electrode, and lithium is provided from the positive electrode by discharge, and lithium metal is used as a negative electrode active material.

Accordingly, the negative electrode may be a lithium metal negative electrode including a lithium-free negative electrode (Li free anode) made of only a copper current collector; or a copper current collector; and a lithium metal layer located on the copper current collector.

In addition to the negative active material, the negative electrode mixture may further include a binder, optionally a conductive material, a filler, and the like.

The binder is a component that assists in the binding between the active material and the other solids, wherein the binder may typically be added in an amount of 0.1 to 30% by weight based on the total weight of the negative electrode containing the negative electrode active material. Examples of the binder include polyvinylidene fluoride, polyvinylidene fluoride-hexafluoropropylene, polyvinyl alcohol, carboxymethylcellulose (CMC), starch, hydroxypropylcellulose, regenerated cellulose, polyvinylpyrrolidone, tetrafluoroethylene, polytetrafluoroethylene, polyethylene, polypropylene, an ethylene-propylene-diene terpolymer (EPDM), a sulfonated EPDM, a styrene-butadiene rubber, a fluorine rubber, various copolymers, and the like.

The conductive material is added in an amount of 0.1 to 30% by weight based on the total weight of the mixture containing the negative electrode active material. Such conductive material is not particularly limited as long as a corresponding battery has high conductivity without causing a chemical change in the battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

Positive Electrode

The positive electrode of a lithium secondary battery may generally have a structure in which a positive electrode mixture including a positive electrode active material is formed on a positive electrode current collector.

In the case of the positive electrode active material, there is no particular limitation as long as it is a material capable of reversibly intercalating and de-intercalating lithium ions. For example, it may include one or more of complex oxides of cobalt, manganese, nickel, or a combination of metals; and lithium. In a more specific example, a compound represented by any of the following chemical formulas can be used as the positive electrode active material. $Li_aA_{1-b}R_bD_2$ (wherein, $0.90 \leq a \leq 1.8$ and $0 \leq b \leq 0.5$); $Li_aE_{1-b}R_bO_{2-c}D_c$ (wherein, $0.90 \leq a \leq 1.8$, $0 \leq b \leq 0.5$, and $0 \leq c \leq 0.05$); $LiE_{2-b}R_bO_{4-c}D_c$ (wherein, $0 \leq b \leq 0.5$, and $0 \leq c \leq 0.05$); $Li_aNi_{1-b-c}Co_bR_cD_\alpha$ (wherein, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (wherein, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_\alpha$ (wherein, $0.90 \leq a \leq 1.8$, $0 \leq b \leq 0.5$, $0 \leq c \leq 0.05$ and $0 < a < 2$); $Li_aNi_{1-b-c}Mn_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, $0.90 \leq a \leq 1.8$ and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \leq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is Ni, Co, Mn or a combination thereof; R is Al, Ni, Co, Mn, Cr, Fe, Mg, Sr, V, a rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

Of course, it is also possible to use one having a coating layer on the surface of the above-mentioned compound, or it is possible to use a mixture of the above-mentioned compound with a compound having a coating layer. The coating layer may include a coating element compound such as coating element oxide, hydroxide, coating element oxyhydroxide, coating element oxycarbonate or coating element hydroxycarbonate. The compounds forming these coating layers may be amorphous or crystalline. As a coating element included in the coating layer, Mg, Al, Co, K, Na, Ca, Si, Ti, V, Sn, Ge, Ga, B, As, Zr or a mixture thereof can be used. As the coating layer forming process, any coating method can be used as long as it can be coated by a method (e.g., spray coating or dipping method, etc.) that does not adversely affect the physical properties of the positive electrode active material by using these elements in the compound. Since this is a content that may be widely understood by those worked in the art, and thus, detailed descriptions thereof will be omitted.

The positive electrode current collector is typically fabricated to a thickness of 3 to 500 μm. The positive electrode current collector is not particularly limited as long as a corresponding battery has high conductivity without causing a chemical change in the battery, and for example, may be formed of stainless steel, aluminum, nickel, titanium, baked carbon, or aluminum, or a material formed by surface-treating a surface of stainless steel with carbon, nickel, titanium, silver, or the like. The current collector may have fine protrusions and depressions formed on a surface thereof to enhance adhesion of a positive electrode active material, and may be formed in various forms such as a film, a sheet, a foil, a net, a porous body, a foaming body, and a non-woven fabric structure.

The detailed description concerning the binder and the conductive material is the same as described in the negative electrode.

Electrolyte

The electrolyte of the lithium secondary battery may be a liquid electrolyte (i.e., an electrolyte solution) or a solid electrolyte.

When the electrolyte of the lithium secondary battery is a liquid electrolyte, it includes a non-aqueous organic solvent and a lithium salt.

The non-aqueous organic solvent serves as a medium capable of moving ions that are involved in an electrochemical reaction of a battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate. Examples of the ester-based solvent may include methyl acetate, ethyl acetate, n-propyl acetate, 1,1-dimethylethylacetate, methylpropionate, ethylpropionate, γ-butyrolactone, decanolide, valerolactone, mevalonolactone, caprolactone, and the like. Examples of the ether-based solvent may include 1,2-dimethoxyethane (DME), dibutyl ether, tetraglyme, diglyme, 2-methyltetrahydrofuran, tetrahydrofuran, and the like. Examples of the ketone-based solvent may include cyclohexanone and the like. Examples of the alcohol-based solvent may include ethyl alcohol, isopropyl alcohol, and the like. Examples of the aprotic solvent may include nitriles such as R—CN (where R is a C2 to C20 linear, branched, or cyclic hydrocarbon group, a double bond, an aromatic ring, or an ether bond), amides such as dimethylformamide, dioxolanes such as 1,3-dioxolane, sulfolane, and the like.

The non-aqueous organic solvents may be used alone or in a mixture of two or more thereof. When the solvents are used in a combination of two or more, the mixing ratio thereof may be appropriately controlled according to the desired battery performance, which may be widely understood by those worked in the art.

In addition, when the carbonate-based solvent is used, it is favorable to use cyclic carbonate and chained carbonate in a mixture thereof. In this case, the cyclic carbonate and the chained carbonate are mixed at a volume ratio of 1:1 to 1:9, so that the performance of the electrolyte can be favorably exhibited.

The non-aqueous organic solvent may further include an aromatic hydrocarbon-based organic solvent in addition to the carbonate-based solvent. Here, the carbonate-based solvent and the aromatic hydrocarbon based organic solvent may be mixed at a volume ratio of 1:1 to 30:1.

As the aromatic hydrocarbon-based organic solvent, an aromatic hydrocarbon-based compound of the following Chemical Formula 1 may be used.

[Chemical Formula 1]

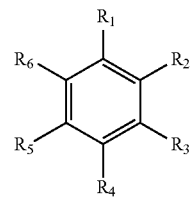

in the Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further contain vinylene carbonate or an ethylene carbonate-based compound of the following Chemical Formula 2 in order to improve the battery lifespan:

[Chemical Formula 2]

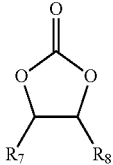

in the Chemical Formula 2, $R_7$ and $R_8$ are each independently hydrogen, a halogen group, a cyano group (CN), a nitro group ($NO_2$), or a C1-C5 fluoroalkyl group, and at least one of $R_7$ and $R_8$ is a halogen group, a cyano group (CN), a nitro group ($NO_2$), or a C1-C5 fluoroalkyl group.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound is further used, the use amounts thereof may be appropriately adjusted to improve the lifetime.

In the electrolyte of the lithium secondary battery, the lithium salt is dissolved in the organic solvent to act as a lithium ion supply source in the battery, thereby enabling a basic operation of a lithium secondary battery of one embodiment and promoting the movement of lithium ions between a positive electrode and a negative electrode.

As the lithium salt, a lithium salt widely applied to an electrolyte may be generally used. For example, as in the Experimental Example described later, lithium bis(fluorosulfonyl)imide (LiFSI) may be used, but additionally, $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are a natural number), LiCl, LiI, $LiB(C_2O_4)_2$ (lithium bis(oxalato)borate; LiBOB) or a combination thereof may be used, without being limited thereto.

Further, in the electrolyte, the concentration of the lithium salt may be controlled within the range of 0.1 to 5.0M. Within this range, the electrolytes can have adequate conductivity and viscosity, so that the lithium ions can be effectively moved within the lithium secondary battery of the one embodiment. However, this is merely an example, and the present disclosure is not limited thereto.

On the contrary, when the electrolyte of the lithium secondary battery is a solid electrolyte, the solid electrolyte that can be used is not particularly limited.

The lithium secondary battery of the one embodiment may not only be used in a unit cell used as a power source for a small device, but also it can be used as a unit cell in a medium or large-sized battery module including a plurality of battery cells. Furthermore, a battery pack including the battery module may be configured.

Advantageous Effects

In the case of applying the separator laminate of one embodiment, even if the metal column grows on the surface of the negative electrode during driving of the lithium secondary battery, the growth direction of the metal column is changed in the horizontal direction between the separation spaces of the separators in the separator laminate, and thereby, micro-short circuit can be effectively prevented.

In addition, when using a coating layer, film, etc. containing organic/inorganic mixtures as separators, the local short circuit can be prevented more effectively.

Meanwhile, since the separators are integrated by an adhesive layer inserted between the adjacent separators, the separator according to one embodiment may be suitable to be applied to an electrode assembly including the laminated structure.

BRIEF DESCRIPTION OF THE DRAWINGS

FIG. 1 schematically shows a possible form of an adhesive layer and an application form thereof according to an embodiment of the present disclosure.

FIG. 2 is a schematic diagram of a unit electrode assembly according to an embodiment of the present disclosure.

FIG. 3 is a schematic diagram of a unit electrode assembly according to an embodiment of the present disclosure.

FIG. 4 is a schematic diagram of a unit electrode assembly according to an embodiment of the present disclosure.

FIG. 5 is a schematic diagram of a unit electrode assembly according to an embodiment of the present disclosure.

FIG. 6 is a schematic diagram of a unit electrode assembly according to an embodiment of the present disclosure.

FIG. 7 is a schematic diagram of a unit electrode assembly according to an embodiment of the present disclosure.

FIG. 8 is a schematic diagram of a unit electrode assembly according to an embodiment of the present disclosure.

FIG. 9 is a schematic diagram of a unit electrode assembly according to an embodiment of the present disclosure.

FIG. 10 is a schematic diagram of a unit electrode assembly according to an embodiment of the present disclosure.

FIG. 11 is a schematic diagram of a unit electrode assembly according to an embodiment of the present disclosure.

FIG. 12 shows the results of evaluating the electrochemical characteristics of each of the lithium secondary batteries of Examples 1 to 2 and Comparative Examples 1 to 3 described later.

FIGS. 13a and 13b show the observation of the separator recovered during driving of the lithium secondary battery of Comparative Example 1 described later.

FIGS. 14a and 14b shows the observation of a separator recovered during driving of the lithium secondary battery of Example 1 described later.

FIG. 15 shows the observation of a separator recovered during driving of a lithium secondary battery of Example 2 described later.

DETAILED DESCRIPTION OF THE EMBODIMENTS

Hereinafter, preferred examples of the present disclosure, comparative examples, and test examples for evaluating them are described. However, the following examples are only preferred examples of the present disclosure, and the present disclosure is not limited to the following examples.

Example 1

(1) Manufacture of a Separator Laminate Having a Structure of [Single-Sided SRS Separator/Adhesive Layer/Single-Sided SRS Separator]

Two polyethylene substrates (width*length*thickness: 40 mm*60 mm*5 μm, porosity 40%) were prepared, and a coating layer was formed on each surface using a dip coating method.

Specifically, a coating solution was produced by using $Al_2O_3$ powder having a D50 particle diameter of 500 nm as the inorganic particle, PVdF as the binder, and NMP (N-methyl-2-pyrrolidone) as the solvent. However, the content of the solid content in the total weight (100% by weight) of the coating solution was set to be 30 wt. %, but the volume ratio of the inorganic particles and the binder was set to be 6:1.

For each of the polyethylene substrates, only 20% of the total thickness was immersed in the coating solution for 3 minutes, which was then taken out and dried at 80° C. for 60 minutes.

Thereby, two single-sided SRS separators were obtained.

One of them was used as the upper separator and the other one was used as the lower separator.

The upper separator and the lower separator were set so that the coating layer directs the outer surface as shown in FIG. 2, and a 1 μm gap was placed between them.

An adhesive film (thickness: 1 μm) was inserted as an adhesive layer in the gap, and then laminated for 3 seconds under the condition of a temperature of 90° C. and a pressure of 5.0 MPa using a roll press device.

Here, the adhesive film was made of PVDF, and the total width*length*thickness was 40 mm*60 mm*3 μm, and an opening of width*length*thickness: 35 mm*55 mm*3 μm was formed in the center (see FIG. 1).

Thereby, an integrated separator laminate having a structure of [single-sided SRS separator/adhesive layer/single-sided SRS separator] was finally obtained, which was referred to as the separator laminate of Example 1.

(2) Manufacture of Lithium Secondary Battery 35 integrated separator laminates of Example 1 were used, 15 double-sided positive electrode sheets, and 16 double-sided negative electrode sheets were used, and two single-sided positive electrode sheets were used at the outermost part, 11 bi-cells were stacked, and assembled in a stack & folding process known in the art to thereby implement a lithium secondary battery.

Here, each double-sided negative electrode sheet was a lithium free negative electrode made of only a 10 μm-thick copper foil current collector. In addition, each single-sided positive electrode sheet was one in which $LiNi_{0.6}Co_{0.2}Mn_{0.2}$ as a positive electrode active material was loaded at 4 $mAh/cm^2$ on a 12 μm-thick Al foil current collector.

As an electrolyte, a high-concentration ether-based electrolyte (3.5M LiFSI in DME) was used to evaluate a 2 Ah stack cell. 3.5M LiFSI (lithium bis(fluorosulfonyl)imide) was dissolved in 1,2-dimethoxyethane (DME), and then injected into the separator in the assembly.

Example 2

(1) Manufacture of a Separator Having a Structure of [Single-Sided SRS Separator/Adhesive Layer/Polyethylene Fabric/Adhesive Layer/Single-Sided SRS Separator]

3 polyethylene substrates (width*length*thickness 40 mm*60 mm*5 μm, porosity 40%) was prepared, and a coating layer was formed on two polyethylene substrates of them in the same manner as in Example 1 to thereby obtain two single-sided SRS separators (upper separator, lower separator) and one polyethylene fabric separator (intermediate separator).

And, the coating layer of the upper separator and the lower separators were set to direct to the outer surface as shown in FIG. 12, and an intermediate separator was interposed between the upper separator and the lower separator, but the gap between the upper separator and one surface of the intermediate separator opposite thereto was set to 1 μm, and the gap between the other surface of the lower separator and the other surface of the intermediate separator opposite thereto was set to 1 μm.

Two adhesive films identical to those used in Example 1 were prepared, an adhesive film (thickness 1 μm) was inserted into each gap between the separators, and then laminated in the same manner as in Example 1.

Thereby, a separator laminate having a structure of [single-sided SRS separator/adhesive layer/polyethylene fabric/adhesive layer/single-sided SRS separator] was finally obtained, which was referred to as the separator laminate of Example 2.

(2) Manufacture of Lithium Secondary Battery

A lithium secondary battery was manufactured in the same manner as in Example 1, except that the separator laminate of Example 2 was used instead of the separator laminate of Example 1.

Comparative Example 1

(1) Manufacture of Double-Sided SRS Separator

One polyethylene substrate (width*length*thickness: 40 mm*60 mm*5 μm, porosity 40%) was prepared and used as a substrate.

Coating layers were formed on both sides of the substrate. Specifically, in the same coating solution as in Example 1, the entire surface of the substrate was immersed for 3 minutes and then taken out, and dried at 80° C. for 60 minutes.

Thereby, a double-sided SRS separator was finally obtained, which was referred to as a separator laminate of Comparative Example 1.

(2) Manufacture of Lithium Secondary Battery

A lithium secondary battery was manufactured in the same manner as in Example 1, except that the separator laminate of Comparative Example 1 was used instead of the separator laminate of Example 1.

Comparative Example 2

(1) Manufacture of a Separator Having a Structure of [Single-Sided SRS Separator/Single-Sided SRS Separator]

A single-sided SRS separator was prepared in the same manner as in Example 1, and then simply laminated without an adhesive film to manufacture a separator having a structure of [single-side SRS separator/single-sided SRS separator].

(2) Manufacture of Lithium Secondary Battery

A lithium secondary battery was manufactured in the same manner as in Example 1, except that the separator of Comparative Example 2 was used instead of the separator of Example 1.

Comparative Example 3

(1) Manufacture of a Separator Having a Structure of [Single-Sided SRS Separator/Polyethylene Fabric/Single-Side SRS Separator]

A single-sided SRS separator was prepared in the same manner as in Example 1, and then simply laminated without an adhesive film using the polyethylene substrate of Example 2 to manufacture a separator having a structure of [single-sided SRS separator/polyethylene fabric/single-side SRS separator].

(2) Manufacture of Lithium Secondary Battery

A lithium secondary battery was manufactured in the same manner as in Example 1, except that the separator of Comparative Example 3 was used instead of the separator of Example 1.

Experimental Example 1 (Evaluation of Electrochemical Properties of Lithium Secondary Battery Each of the separator laminates of Examples 1 to 2 and Comparative Example 1 was assembled in a stack-and-folding process, thereby enabling driving as a lithium secondary battery.

However, each of the separator laminates of Comparative Examples 2 and 3 could not be implemented as an electrode assembly including lamination such as stack & folding and lamination & folding.

Specifically, each of the separators of Comparative Examples 2 and 3 included two or more separators, but adjacent separators were independently separated, and a large number of mismatches occurred, and thus could not be implemented as the electrode assembly including lamination.

Therefore, each of the separators of Comparative Examples 2 and 3 was assembled in the form of a coin cell commonly known in the art, and implemented as a lithium secondary battery.

The discharge capacity according to the charge/discharge cycle of each lithium battery was normalized to the discharge capacity of the first cycle, and the results are shown in FIG. 2.

Charge: 0.1 C, CC/CV, 4.25V, 1/20C cut-off
Discharge: 0.5 C, CC, 3.0 V, cut-off

Here, in order to increase the reliability of the experimental results, when charge/discharge experiments for each lithium secondary battery were conducted 3 times and micro-short circuit occurred two times or more, it was indicated as "whether or not micro-short circuit occurred: presence" in in Table 1 below. Further, in the case of "the cycle number at the point where the capacity retention rate reached 80% at 0.1 C charge/0.5 C discharge", the results obtained by the three charge/discharge experiments were arithmetically averaged and recorded in Table 1 below.

Independently from this, it was charged up to 4.25 V at 0.1 C and then discharged up to 3 V at 0.1 C under constant current (CC) conditions. The results of measuring the discharge capacity are also shown in Table 1 below.

Referring to Table 1 and FIG. 12, it can be seen that each of the separator laminates of Examples 1 to 2 may be implemented as an electrode structure including lamination such as stack & folding as well as lamination & folding. This is because each of the separator laminates of Examples 1 to 2 includes two or more substrates, but an adhesive film is inserted each between adjacent substrates to form an integrated separator.

Further, in each of the separator laminates of Examples 1 to 2, the adhesive film is in contact with only the border portions of adjacent separators, thus partially leaving a separation space between adjacent separators. The separation space between adjacent separators induces a change in the growth direction of the metal column, inhibits micro-short circuit and ultimately secure the life of the battery.

Specifically, in each of the separator laminates of Examples 1 to 2, even if the lower separator is pierced by a metal column grown toward the positive electrode from the surface of the negative electrode, the metal column whose growth direction is changed is made to grow horizontally in the separation space between separators when the growth of the metal column is blocked by the intermediate separator (Example 2) or the upper separator (Examples 1 and 2), thereby inhibiting micro-short circuit.

On the other hand, the separator of Comparative Example 1 can be implemented as an electrode structure including lamination, such as stack & folding and lamination & folding.

However, in the separator of Comparative Example 1, an SRS separator in which an adjacent substrate and a coating layer are integrally formed does not have a structure in which a separation space is formed between the two separators, and thus, it is not possible to induce a change in the growth direction of the metal column grown from the negative electrode, and it is not possible to inhibit micro-short circuit of the lithium secondary battery to which this is applied.

Actually, according to FIG. 13, in the case of Comparative Example 1, it can be seen that after 14 cycles, a phenomenon in which the charge capacity excessively increases occurs. In addition, it can be confirmed that the lithium secondary battery to which the separator of Comparative Example 1 is applied stops driving before reaching 80% of the capacity retention rate due to a micro-short circuit occurring at the initial state of driving.

TABLE 1

| | Whether stack type battery assembly is possible | whether or not micro-short circuit occurred | Cycle number at the occurrence point of micro-short circuit | 0.1 discharge capacity (Ah) | Cycle numbers at the point where the capacity retention reached 80% during 0.1 C charge/0.5 C discharge |
|---|---|---|---|---|---|
| Example 1 | Possible | Absence | (No micro-short circuit occurred) | 2.02 | 46 |
| Example 2 | Possible | Absence | (No micro-short circuit occurred) | 2.01 | 41 |
| Comparative Example 1 | Possible | Presence | 14 | 2.02 | (Evaluations is impossible) |
| Comparative Example 2 | Impossible | Absence (Coin cell evaluation) | (No micro-short circuit occurred) | 0.05 (Coin cell evaluation) | 37 |
| Comparative Example 3 | Impossible | Absence (Coin cell evaluation) | (No micro-short circuit occurred) | 0.05 (Coin cell evaluation) | 38 |

Experimental Example 2 (Observation of Whether Micro-Short Circuit Occurred

The lithium secondary battery of Comparative Example 1 that was driven according to Experimental Example 1 allowed to stop at the 14th cycle and then decomposed to recover the separator. The separator of Comparative Example 1 thus recovered was photographed with a digital camera and a digital microscope (Dino-Lite Digital Microscope), respectively, and each photographed image is shown in FIGS. 13a and 13b.

Specifically, with respect to the recovered separator of Comparative Example 1, the both surfaces were separated based on the center of thickness, photographed with a digital camera, and shown in FIG. 13a. In the order from left to right of FIG. 13a, of the both sides of the recovered separator, it corresponds to the outside and inside of the surface in contact with the negative electrode, and the inside and outside of the surface in contact with the positive electrode.

Further, FIG. 13b is a photograph of a metal column embedded in the inside of the surface in contact with the positive electrode among both sides of the recovered separator, taken with a digital microscope.

Referring to FIGS. 13a and 13b, the double-sided SRS separator of Comparative Example 1 has only one substrate, so it is vulnerable to attack by metal columns grown from the negative electrode, and is a structure in which between the upper coating layer and the substrate, and between the upper coating layer and the substrate, are attached without any gaps, respectively, and thus, it is possible to know that there is no room for the growth direction of the metal column to change.

The lithium secondary battery of Example 1 that was driven according to Experimental Example 1 allowed to stop at the 46th cycle (when the capacity retention rate reached 80%), and then decomposed to recover the separator. The separator laminate of Example 1 thus recovered was photographed with a digital camera, and the photographed image is shown in FIGS. 14a and 14b.

Specifically, with respect to the recovered separator laminate of Example 1, the outside and inside of the first separator and the second separator in contact with the positive electrode are shown.

Referring to FIGS. 14a and 14b, it can be confirmed that in the separator laminate of Example 1, the first separator was pierced, but metal columns were grown horizontally on the surface of the second separator, and the surface in contact with the positive electrode could not be pierced.

In addition, the lithium secondary battery of Example 2, which was driven according to Experimental Example 1, was stopped in a fully charged state at the 41st cycle (when the capacity retention reached 80%), and then decomposed to recover the separator. The separator laminate of Example 2 thus recovered was photographed with a digital camera, and the photographed image is shown in FIG. 15.

Specifically, with respect to the recovered separator laminate of Example 2, the both surfaces were separated based on the intermediate separator, then photographed with a digital camera and shown in FIG. 15. In the order from left to right of FIG. 15, in the both sides of the recovered separator, it corresponds to the outside and inside of the surface in contact with the negative electrode, and the inside and outside of the surface in contact with the positive electrode.

Referring to FIG. 15, in the separator laminate of Example 2, no portion attacked by the metal column grown from the negative electrode was found.

This is inferred to be because the thickness of the separator is partially thickened by a structure in which three separators are laminated, the thickness of the separator is partially thickened, and thus has excellent mechanical strength, as compared with the case of using one separator of Comparative Example 1.

Even if the lower separator in contact with the negative electrode in the separator laminate of Example 2 was attacked by a metal column, additional growth of the metal column would have been blocked by the intermediate separator. Further, in the separator laminator of Example 2, an adhesive layer is present between the lower separator and the intermediate separator, and the adhesive layer creates a separation space between the separators, Thus, it is inferred that the metal column, which stopped further growth, does not cause a short circuit because the growth direction changes to the horizontal direction in the separation space.

Those of ordinary skill in the field to which the present disclosure belongs will be able to perform various applications and modifications within the scope of the present disclosure based on the above disclosure.

The invention claimed is:

1. A lithium secondary battery comprising:
an electrode assembly comprising a negative electrode, a positive electrode, and a separator laminate disposed between the negative electrode and the positive electrode,
wherein the separator laminate comprising: a plurality of separators; and adhesive layers disposed between adjacent separators,
wherein the adhesive layers are disposed along edges of the adjacent separators so as to have a separation space between the adjacent separators,
wherein the separation space is located at center portions of the adjacent separators and does not include a positive electrode or a negative electrode.

2. The lithium secondary battery according to claim 1, wherein the adhesive layers are in a form of a frame in which the central portion is opened.

3. The lithium secondary battery according to claim 2, wherein border portions of the separators adjacent to at least one of the adhesive layers are connected and fixed to each other, by at least one of the adhesive layers.

4. The lithium secondary battery according to claim 1, wherein each of the plurality of separators comprises at least one selected from the group consisting of a single-sided SRS separator, a double-sided SRS separator, a polyolefin fabric, a free-standing organic/inorganic mixed film, and a polymer-based separator.

5. The lithium secondary battery according to claim 4, wherein at least one of the plurality of separators comprises at least one selected from the group consisting of a single-sided SRS separator, a double-sided SRS separator, and a free-standing organic/inorganic mixed film.

6. The lithium secondary battery according to claim 1, wherein at least one of the adhesive layers comprises one selected from the group consisting of polyvinylidene fluoride (PVdF), polytetrafluoroethylene (PTFE), styrene butadiene rubber (SBR), polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and polyvinylalcohol, or a mixture of two or more thereof.

7. The lithium secondary battery according to claim 1, wherein at least one of the adhesive layers has a thickness of 0.01 μm to 100 μm.

8. The lithium secondary battery according to claim 1, wherein
an area of the separator laminate is larger than an area of the negative electrode and an area the positive electrode and thus extended outwardly at four corners of the negative electrode and the positive electrode, and
at least one of the adhesive layers of the separator laminate is disposed at a portion not facing the negative electrode or the positive electrode along the edge of the separator included in the separator laminate.

9. The lithium secondary battery according to claim 1, wherein
the negative electrode is a lithium metal negative electrode comprising:
a lithium-free negative electrode, which is a Li free anode, made of only a copper current collector; or
a copper current collector; and
a lithium metal layer located on the copper current collector.

10. A lithium secondary battery according to claim 1, wherein the electrode assembly is implemented in a stack process, a lamination and stack process, a stack and folding process, a jelly-roll process, or a zigzag folding process.

11. The lithium secondary battery of claim 1, wherein
when charging the lithium secondary battery with a constant current of 0.1° C. in a temperature range of 20 to 30° C. until reaching 4.25 V and then discharging the lithium secondary battery with a constant current of 0.5° C. until reaching 3.0 V is referred to as one charge/discharge cycle,
at the point of the time the capacity retention rate according to the following Equation 1 reaches 80%, n is 30 or more:

Capacity retention rate (%)=100*{Discharge capacity after $n$ cycles}/{Discharge capacity after 1 cycle}.  [Equation 1]

12. The lithium secondary battery according to claim 1, wherein the separation space is 50 to 99 area % of the separator.

13. The lithium secondary battery according to claim 1, wherein at least one of the adhesive layers has a thickness of 0.1 μm to 10 μm.

14. The lithium secondary battery according to claim 1, wherein a shape of the separation space formed by the adhesive layers is polygonal shape.

15. The lithium secondary battery according to claim 1, wherein a shape of the separation space formed by the adhesive layers is rectangular shape.

16. The lithium secondary battery according to claim 1, wherein a shape of the separation space formed by the adhesive layers is circular shape.

* * * * *